United States Patent [19]

Fujishige et al.

[11] Patent Number: 4,681,626
[45] Date of Patent: Jul. 21, 1987

[54] METHOD OF REFINING ALUMINUM

[75] Inventors: Masao Fujishige; Harumi Yokokawa; Seiichi Ujiie; Masayuki Dokiya, all of Yatabemachi, Japan

[73] Assignee: Agency of Industrial Science and Technology, Tokyo, Japan

[21] Appl. No.: 823,433

[22] Filed: Jan. 28, 1986

[30] Foreign Application Priority Data

Feb. 2, 1985 [JP] Japan ................................. 60-19106

[51] Int. Cl.⁴ ........................... C22B 21/02; C22B 7/04
[52] U.S. Cl. .................................. 75/68 A; 75/68 A; 75/68 R
[58] Field of Search ..................... 75/68 A, 24, 68 R

[56] References Cited

U.S. PATENT DOCUMENTS

| | | | |
|---|---|---|---|
| 1,350,150 | 8/1920 | Gerber | 75/68 A |
| 3,975,187 | 8/1976 | Kibby | 75/68 A |
| 4,445,934 | 5/1984 | Fujishige et al. | 75/68 A |

FOREIGN PATENT DOCUMENTS 126730 7/1984 Japan ................................. 75/68 A

*Primary Examiner*—Melvyn J. Andrews
*Attorney, Agent, or Firm*—Armstrong, Nikaido, Marmelstein & Kubovcik

[57] ABSTRACT

The present invention provides a method of refining aluminum, according to which oxygen gas is blown into a carbon material filled in a blast furnace to form simultaneously both combustion regions where combustion of the carbon material takes place and high-temperature reduction regions spaced apart from said combustion region, and an alumina-containing material and a flux are fed on the carbon material fill layer to form a melt of a mixture of the both, the formed melt being flowed down to the reduction regions to form a crude aluminum alloy, which is hydrogenated.

13 Claims, 2 Drawing Figures

METHOD OF REFINING ALUMINUM

BACKGROUND OF THE INVENTION

The present invention relates to a method of refining aluminum. More particularly, it relates to a method of refining a crude aluminum alloy refined by a blast furnace method.

Aluminum is the most basic material next to iron and the demand for it has been increasingly made year after year.

Up to this time, aluminum has been refined by the electrolysis of molten alumina.

Recently, the refining of alumina has become more difficult with increasing energy cost on a worldwide scale, especially in a region in which the cost of electric power is high, for example, in Japan.

The inventors of the present invention proposed, as a substitute for the above electrolysis method, a method of refining aluminum by using a blast furnace which comprises reducing alumina as a raw material with a carbon material in a blast furnace of a countercurrent moving bed (see U.S. Pat. No. 4,445,934).

According to this blast furnace method, aluminum is obtained as a crude alloy containing iron and silicon. This crude alloy is extracted with a molten metal such as lead or magnesium, and the molten metal is separated from the extract by distillation or a liquid separation method. The residue is further refined by distillation or crystallization to obtain a usable aluminum.

However, the aluminum alloy obtained by this blast furnace method contains a large amount of impurities such as carbon and calcium carbide together with slag components such as calcia and alumina, so that these impurities hinder the contact between the molten extractant metal and aluminum in the above extraction step, thus decreasing the extraction efficiency of aluminum. Further, these impurities contaminate the extractant metals such as lead and magnesium to decrease the recovery of these metals.

Furthermore, it is impossible to separate the slag, carbon and calcium carbide are separated from the crude alloy in a molten state beforehand to avoid adverse influences of these impurities, because the difference in specific gravity between aluminum and the slag or the impurities is so small that these impurities and molten aluminum are dispersed in each other.

The addition of a flux such as calcium fluoride or cryolite hardly changed the above state.

OBJECTS OF THE INVENTION

A first object of the present invention is to provide a method of removing slag such as calcia and alumina and impurities such as carbon and calcium carbide from a crude aluminum alloy obtained by a blast furnace method.

A second object of the invention is to provide a method of refining a crude aluminum alloy obtained by a blast furnace method by hydrogenation.

A third object of the invention is to provide a method of hydrogenating a crude aluminum alloy obtained by a blast furnace method to obtain an aluminum alloy having a high aluminum content.

DESCRIPTION OF THE PREFERRED EMBODIMENT

The present invention will now be described with reference to the attached drawings.

The crude aluminum alloy to be used as a raw material in the present invention is produced from alumina by a blast furnace refining method. This blast furnace method will be described in the first place below.

Figure 1:
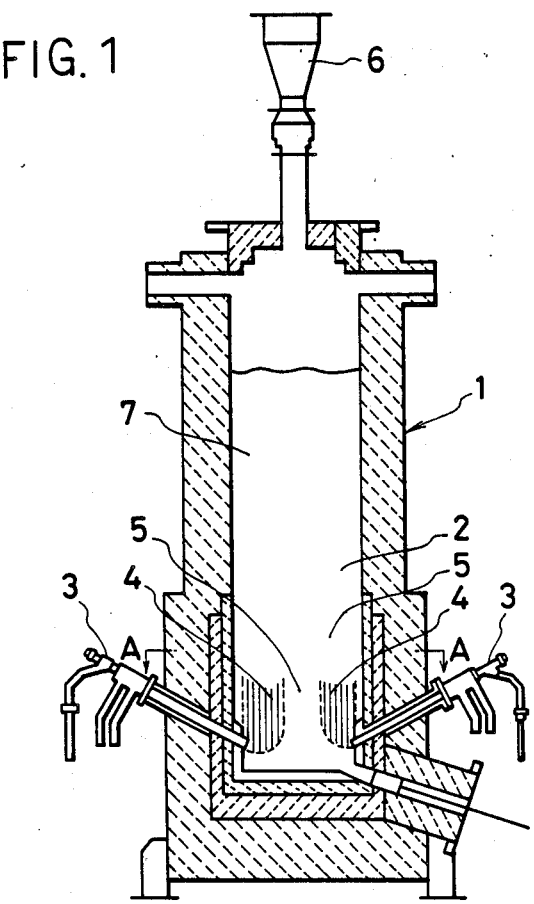
FIG. 1 is a longitudinal sectional view of a blast furnace to be used in the present invention.
Figure 2:
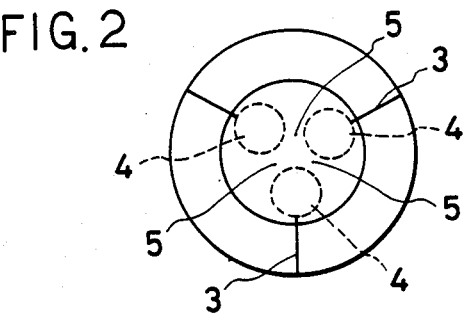
FIG. 2 shows a schematic view in section, taken along line A—A of FIG. 1.

As shown in FIGS. 1 and 2, a blast furnace 1 is filled with a carbon material which acts as a fuel and a reducing agent, for example, coke or coal. Oxygen gas is directed into the fill layer 2 from a plurality of oxygen inlet tubes 3 to form a plurality of high-temperature combustion regions 4 which are spaced apart from each other.

The reaction in the combustion regions 4 is fundamentally represented by the formula (I):

$$C + \tfrac{1}{2}O_2 = CO \qquad (I)$$

The maximum temperature of the carbon material, for example coke, in the combustion regions 4 is generally at least 2700° C., preferably at least 2900° C.

The particle size of the carbon material (for example, coke) to be used in the present invention is at least 10 mm, preferably 15 to 50 mm.

An increase in the particle size serves to raise the temperature in the combustion regions.

The amount of the carbon material used must be at least 30 mol per mol of the alumina used to generate a large amount of heat of combustion and to promote a reduction reaction which will be described.

Simultaneously with the formation of the combustion regions 4, a plurality of reduction regions 5 are formed between the combustion regions 4 themselves and above them.

The temperature of the reduction regions is generally at least 2000° C., preferably 2050° to 2200° C.

The combustion gas containing CO as a main component which is generated by the combustion of a carbon material flows upward through the fill layer, while a melt of a mixture of calcia and alumina which will be described below and the carbon material flow downward to be in counter-current contact with the combustion gas.

According to the present invention, a mixture 7 comprising an alumina containing material and a flux is fed to a space over the fill layers 2 from a hopper 6.

Clay, bauxite or the like can be used as the alumina containing material. Such an alumina-containing material generally contains iron components and silicon components, so that the reaction which will be represented below by the formula (II) proceeds smoothly in the reduction regions.

The weight ratio of iron to aluminum in the alumina containing material is generally at least 1/5, preferably at least ⅓.

Generally, bauxite briquette is used as the alumina containing material. This briquette may be mixed with a carbon material prior to its use to thereby coat the surface thereof with the carbon material or be mixed with a calcium compound which will be described below.

The briquette to be used in the present invention is produced by molding bauxite by the use of a compression molding machine according to an ordinary method and sintering the molded product to enhance the strength.

More precisely, a powdered bauxite or a mixture thereof with a coke powder is blended with a binder such as bentonite or waste pulp liquor to form an almond- or egg-shaped briquette. The obtained briquette may be sintered as such. Alternatively, the briquette may be treated with a carbon material to coat the surface thereof with the material and sintered.

The molded product has a major axis of about 25 to 70 mm and a minor axis of 10 to 30 mm. No influence of the size was particularly observed.

After the molding, the molded product is sintered at 1300° C. for at least 15 minutes to obtain a briquette having a sufficiently high strength.

According to the present invention, a flux is used to melt an alumina-containing material- which is difficult to melt because of its high melting point- at a low temperature. Calcium compounds such as calcia (CaO) or calcium carbonate are used as the flux. Particularly, well calcined calcia is preferred.

The flux can be fed into a blast furnace as a mixture thereof with an alumina-containing material. Alternatively, the flux and the alumina-containing material can be fed separately. For example, the calcium compound and an alumina-containing material can be added successively in layers.

The molar ratio of the calcium compound used to the alumina-containing material used is at least 0.2, preferably at least 0.4 and, more preferably, 0.4 to 2.0 in terms of the $CaO/Al_2O_3$ ratio.

Further, it is possible to use a briquette prepared by mixing the calcium compound with an alumina-containing material and converting the obtained mixture into briquette.

In such a case, the molar ratio in the briquette of the calcium compound to the alumina-containing material is at most 1, preferably at most 0.6 and, more preferably, 0.2 to 0.6 in terms of the $CaO/Al_2O_3$ ratio.

By using such a flux, an alumina-containing material can be molten in a region having a temperature of 1600° to 1800° C., lower than that in the reduction region 5, together with the flux (i.e., calcium compound) to form a liquid melt of a mixture of calcia and alumina, which evenly flows down through coke lumps in the coke layer 2 in the blast furnace.

That is to say, the liquid melt of a mixture of calcia and alumina flows downward into both the reduction regions 5 and the combustion regions 4.

The melt of a mixture of calcia and alumina which has flowed down into the combustion regions 4 is partially subjected to redox reaction to generate $Al_2O$, SiO and so forth. However, most of the melt flows down to the bottom of the blast furnace as a melt of a mixture of alumina, calcia and silica. The generated $Al_2O$, SiO and so forth are trapped in the upper low-temperature region of the furnace.

On the other hand, as represented by the reaction formula (II), the melt which has flowed down into the reduction regions 5 is partially reduced and simultaneously reacted with coexistent iron component and silica component to form a crude aluminum alloy comprising aluminum, iron and silicon:

$$Al_2O_3 + MO + 4C = 2Al - M + 4CO \tag{II}$$

wherein M stands for iron or silicon.

In contrast, if the alumina-containing material is not liquefied, a solid alumina-containing material will move as the solid, so that it will be fed into the combustion regions 4 which consume solid coke at a highest rate. Therefore, the proportion of the briquette of an alumina-containing material which reaches the reduction regions will be remarkably reduced.

In the reduction regions 5, a part of the alumina-containing material is reduced, so that the reduction product passing through the reduction regions 5 contains a remaining melt of a mixture of alumina and calcia. The crude aluminum alloy flows down in the furnace in a state protected by this remaining melt of a mixture of alumina and calcia to thereby be prevented from re-oxidation with oxygen.

Further, aluminum is converted into an alloy containing iron and silicon, so that the activity of aluminum is lowered. Therefore, the thermodynamic condition for the generation of metal is relaxed to thereby depress the evaporation of aluminum vapor, $Al_2O$, SiO and so forth.

On the other hand, a stream of $Al_2O$ vapor flows upward from the bottom in the blast furnace. This stream is reacted with carbon to form aluminum carbide.

Therefore, the liquid melt of a mixture of calcia and alumina flowing down in the furnace contains a small amount of aluminum carbide.

In addition, aluminum carbide and calcium carbide are generated also in the reduction regions.

These carbides enhance the reduction rate of the liquid melt of a mixture of calcia and alumina.

Accordingly, it is effective to add aluminum carbide or calcium carbide to an alumina-containing material beforehand. The amount of the carbide to be added in this case is 0.1 to 10% by weight, preferably 1 to 5% by weight, based on the alumina-containing material.

According to the above method, a melt of a mixture of alumina and calcia and a crude aluminum alloy comprising aluminum, iron and silicon are obtained from the bottom of the furnace.

However, as described above, these products contain large amounts of impurities such as carbon and calcium carbide together with slag components such as calcia and alumina.

These impurities hinder the extraction of aluminum from the crude aluminum alloy with a molten metal such as lead or magnesium.

According to the present invention, the obtained crude aluminum alloy is hydrogenated to remove carbon and calcium carbide, thus enhancing the aluminum content of the alloy.

According to the present invention, the reactions represented by the reaction formulas (III) and (IV) below proceed in the hydrogenation.

$$CaC_2 + 5H_2 = CaH_2 + 2CH_4 \tag{III}$$

$$C + 2H_2 = CH_4 \tag{IV}$$

This hydrogenation can proceed at a hydrogen pressure of at least 1 atm and a temperature of at least 300° C. However, it is preferably carried out at a hydrogen pressure of 10 to 500 atm and a temperature of 600° to 900° C. on an industrial scale in consideration of the maintenance of a certain reaction rate and the durability of the material of equipment.

A first advantage of the treatment represented by the above reaction formulas (III) and (IV) is that calcium carbide and carbon contained in the crude alloy are converted into hydrocarbons such as methane and calcium hydride.

Further, unreacted alumina contained in the slag is reduced with the generated calcium hydride to aluminum as represented by the following reaction formula (V):

$$3CaH_2 + Al_2O_3 = 2Al + 3CaO + 3H_2 \quad (V)$$

Therefore, by this hydrogenation, the yield of aluminum in the blast furnace refining can be made equivalent to the total yield of metallic aluminum and calcium carbide (i.e. calcium hydride).

A second advantage of the hydrogen treatment according to the present invention is not only that the content of carbon and calcium carbide which are contaminants with a metal used for extracting aluminum, such as lead or magnesium, is reduced, but also that the decrease in the carbon content enables a vacuum distillation of the crude aluminum alloy.

More precisely, if a crude aluminum alloy from a blast furnace is directly vacuum-distilled according to the prior art, at a high temperature, for example, at 1500° to 1990° C. to generate aluminum vapor, thus separating and refining metallic aluminum, the carbon components present in the crude alloy will react with oxygen components present in the slag, thus contaminating the refined metallic aluminum as represented by the following reaction formulas (VI) to (VIII):

$$C + O = CO \quad (VI)$$

$$Al + 3CO = Al_2O_3 3C \quad (VII)$$

$$4Al + 3C = Al_4C_3 \quad (VIII)$$

According to the present invention, however, reactions (VI) to (VIII) can be prevented by the hydrogenation, thus enabling the vacuum distillation of a crude aluminum alloy, which is an advantage of the present invention.

Effects of the Invention

As described above, according to the present invention, a crude aluminum alloy refined by blast furnace method is hydrogenated to convert impurities contained in the crude aluminum alloy, for example, carbon or calcium carbide, into hydrocarbons and calcium hydride. Further, unreacted alumina is reduced with the generated calcium hydride into metallic aluminum.

Therefore, the hydrogenated crude aluminum alloy has an enhanced aluminum content and post-refining thereof, for example, extraction of aluminum with a molten metal, such as lead or magnesium, or distillation is facilitated.

Now, examples of the present invention will be described.

EXAMPLE 1

Production of crude aluminum alloy by blast furnace method

A laboratory furnace having an internal diameter of 60 cm and an internal height of 240 cm was fitted with three oxygen blast pipes having a tuyere diameter of 14 mm at a circumferential angle of 120°. The downward angle of the pipe against the horizontal line was 20°.

Coke having a size of 15 to 25 mm was filled into the space between the furnace bottom and the tuyere with a distance of about 20 cm so as to retain the refined crude aluminum alloy among the cokes. Further, a tap hole was provided at the bottom.

120 kg of coke briquette, composed of 1000 parts of bauxite, 250 parts of coke powder for mixing and 770 parts of coke powder for coating and having an outer diameter of 30 to 35 mm, 360 kg of coke and 60 kg of well calcined calcia were charged into the furnace alternately from a top hopper, while burning the coke with an oxygen flow rate of 500 l/min.

About 13 kg of crude aluminum alloy was obtained from the bottom by tapping.

This crude alloy comprised 32.2% of Al, 40.3% of Fe, 20.4% of Si, 1.74% of Ca, 2.88% of C and 2.27% of Ti.

The amount of the coke consumed during the preheating (for 29 hours) was 300 kg, while those of the coke and the briquette charged during the period of from the beginning of the charging of the coke to the termination thereof (for 20 hours) were 790 kg and 260 kg, respectively.

Tapping was carried out after the completion of preheating, after 10 hours from the beginning of the charging of briquette and just before the termination of the charging to obtain 6.5 kg, 7.3 kg, and 6.1 kg of sample, respectively.

Additionally, about 26 kg of slag was generated and separated from the crude alloy. The obtained slag was roughly composed of $CaO-Al_2O_3$ melt containing 8% of $CaC_2$ and a part which partially contained metallic aluminum but scarcely contained $CaC_2$. The representative composition of the latter part was 30.4% of Al, 5.2% of Fe, 2.1% of Si, 13.5% of C and 0.7% of Ti.

The maximum temperature at the tip of the tuyere was 3200° C., while that of the fill layer was 2000° to 2100° C.

The composition of the combustion gas at this point was 99.7% of CO and 0.3% of $O_2$.

EXAMPLE 2

Refining of crude aluminum alloy by blast furnace method

Raw briquette material was treated under the same conditions as in Example 1, except that a laboratory furnace obtained by lining the same laboratory furnace as in Example 1 with carbon black so as to give an internal diameter of 48 cm was used.

First, only bauxite was molded into almond-like shape of 12×18×26 mm and sintered in a rotary kiln at 1200° to 1300° C. to produce raw briquette material.

26 kg of a crude aluminum alloy and 15 kg of slag were produced in a similar manner as in Example 1 by using 78 kg of the above briquette material, 50 kg of well sintered calcia and 605 kg of coke (305 kg of which was for preheating).

This crude alloy comprised 24.8% of Al, 42.4% of Fe, 21.6% of Si, 3.87% of C and 1.38% of Ca and contained about 1% of $CaC_2$.

The slag comprised 7.6% of Al, 3.62% of Fe, 0.67% of Si, 23.3% of C, 0.12% of Ti and 51.3% of Ca and contained about 20% of $CaC_2$.

EXAMPLE 3

Hydrogeration of slag 500 g of the $CaC_2$-containing slag produced in Example 2 was filled in a central part of a pressure container made of stainless steel (30 mm$\phi$×700 mmL) to form a fill layer of a height of 40 cm.

Hydrogen (100 atm) was introduced to batchwise react the sample therewith, while maintaining the temperature of the point where the sample was placed at 400° to 800° C.

The mixture of the hydrogen and the generated gaseous methane was replaced with pure hydrogen every 24 hours. After this replacement had been repeated 9 times, the methane content in the replaced gas decreased to 1% or below.

The sample after the hydrogenation was reacted with hydrochloric acid to generate 530 ml of hydrogen per g of the sample, while the generation of acetylene was not observed.

On the other hand, the sample before the hydrogenation generated 470 ml of gas per g of the sample, 14% of which was acetylene.

Further, the carbon content decreased to 1% or below.

It was confirmed from this fact that $CaC_2$ (18% by weight) contained in the slag as a raw material was converted into $CaH_2$.

EXAMPLE 4

30 g of the hydrogenated slag obtained in Example 3 was reacted with 5 g of alumina in an argon atmosphere at 1200° C. to obtain about 1.5 g of crude aluminum alloy.

This result shows that the yield (31%) of the crude aluminum alloy in this Example increased by about 3% as compared with that (28%) in Example 2.

What is claimed is:

1. A method of reducing and refining aluminum which comprises the steps of:
    filling a blast furance with a carbon material;
    directing oxygen gas into said carbon material so as to form a plurality of combustion regions in which combustion of said carbon material takes place, said combustion regions extending from the periphery of the furnace toward the center thereof, and the carbon material outside said combustion regions constituting a high-temperature reduction zone, whereby said carbon material serves as a combustion agent as well as a reducing agent;
    feeding an alumina-containing material and a flux onto the top of said carbon material, allowing the alumina-containing material and flux to be melted by the combustion heat from the burning carbon material, thereby forming a liquid melt mixture of said alumina-containing material and said flux;
    allowing said liquid melt mixture to flow down into and through said high-temperature reduction zone and causing the alumina in said alumina-containing material to become partially reduced to aluminum by the carbon material;
    taking out of the furnace a crude aluminum alloy comprising (1) calcium carbide formed from the carbon material and the flux, (2) the carbon material, and (3) the aluminum formed through the above reduction;
    hydrogenating said crude aluminum alloy to remove the carbon material and calcium carbide from the crude aluminum alloy and increase the aluminum content of said alloy;
    taking out of the furnace a slag and hydrogenating the slag to convert unreacted alumina contained in the slag into aluminum.

2. A method of refining aluminum as set forth in claim 1, wherein the carbon material is coke or coal.

3. A method of refining aluminum as set forth in claim 1, wherein the alumina-containing material is bauxite or clay.

4. A method of refining aluminum as set forth in claim 1, wherein the flux is calcia or calcium carbonate.

5. A method of refining aluminum as set forth in claim 1, wherein the alumina-containing material is used in the form of briquette.

6. A method of refining aluminum as set forth in claim 5, wherein the briquette is a molded material prepared by kneading a mixture of an alumina-containing material and a carbon material together with a binder and coating the surface of the kneaded material with a carbon material.

7. A method of refining aluminum as set forth in claim 1, wherein the alumina-containing material and the flux are fed as a mixture of both on the carbon material fill layer.

8. A method of refining aluminum as set forth in claim 1, wherein the flux and the alumina-containing material are alternately fed onto the top of said carbon material.

9. A method of refining aluminum as set forth in claim 7, wherein the molar ratio of the flux to the alumina-containing material is at least 0.2 in terms of the $CaO/Al_2O_3$ ratio.

10. A method of refining aluminum as set forth in claim 8, wherein the molar ratio of the flux to the alumina-containing material is at least 0.2 in terms of the $CaO/Al_2O_3$ ratio.

11. A method of refining aluminum as set forth in claim 1, wherein the flux and the alumina-containing material are fed in the form of briquette onto the top of said carbon material.

12. A method of refining aluminum as set forth in claim 11, wherein the molar ratio of the flux to the alumina-containing material is at most 1 in terms of the $CaO/Al_2O_3$ ratio.

13. A method of refining aluminum as set forth in claim 1, wherein the hydrogenation of the crude aluminum alloy is carried out at a hydrogen pressure of 10 to 500 atm and a reaction temperature of 200° to 900° C.

* * * * *